United States Patent [19]

Bonin et al.

[11] Patent Number: 4,985,485
[45] Date of Patent: Jan. 15, 1991

[54] FIRE-RESISTANT POLYAMIDE COMPOSITIONS

[75] Inventors: Yves Bonin, Brignais; Jack LeBlanc, Saint-Genis Laval, both of France

[73] Assignee: Rhone-Poulenc Chimie, Courbevoie, France

[21] Appl. No.: 421,058

[22] Filed: Oct. 13, 1989

[30] Foreign Application Priority Data

Oct. 13, 1988 [FR] France .................................. 88 14298

[51] Int. Cl.$^5$ ............................ C08K 5/30; C08K 5/26
[52] U.S. Cl. ..................................... 524/403; 523/205; 524/327; 524/394; 524/436; 524/606; 524/80
[58] Field of Search ................. 524/80, 403, 436, 606, 524/394, 327; 523/205

[56] References Cited

U.S. PATENT DOCUMENTS

| | | | |
|---|---|---|---|
| 3,468,843 | 9/1969 | Busse | 524/403 |
| 4,085,088 | 4/1978 | Miyata et al. | 524/436 |
| 4,399,064 | 8/1983 | Penneck | 524/403 |
| 4,559,372 | 12/1985 | Giroud-Abel | 524/80 |
| 4,612,339 | 9/1986 | Giroud-Abel | 524/80 |
| 4,675,356 | 6/1987 | Miyata et al. | 524/436 |
| 4,729,854 | 3/1988 | Miyata et al. | 524/436 |

FOREIGN PATENT DOCUMENTS

| | | |
|---|---|---|
| 0129805 | 1/1985 | European Pat. Off. . |
| 0141763 | 5/1985 | European Pat. Off. . |
| 2332306 | 6/1977 | France . |
| 2075989 | 11/1981 | United Kingdom . |

Primary Examiner—Veronica P. Hoke
Attorney, Agent, or Firm—Burns, Doane, Swecker & Mathis

[57] ABSTRACT

Fire-resistant polyamide compositions contain red phosphorus, a lanthanide-based compound, optionally glass fibers, and a hydrotalcite stabilizer having the general formula: $Mg_{(1-a)}Al_a(OH)_2A_{a/2} \cdot pH_2O$ in which $A = SO_4^{2-}$ or $CO_3^{2-}$, $0 < a \leq 0.5$ and $0 < p < 1$; shaped articles produced therefrom exhibit an excellent compromise of properties in respect of fire resistance, resilience, arc tracking resistance and aging behavior in a hot and humid atmosphere.

9 Claims, No Drawings

FIRE-RESISTANT POLYAMIDE COMPOSITIONS

BACKGROUND OF THE INVENTION

1. Field of the Invention:

The present invention relates to novel polyamide compositions comprising a fire-resisting amount of red phosphorus and intended especially for the manufacture of articles for the electrical and electronics industries. More particularly, this invention relates to polyamide compositions for the production of fire-resistant articles presenting a good compromise of properties, notably with regard to fire resistance, resilience, arc tracking resistance and surface appearance.

2. Description of the Prior Art:

It is known to this art that the addition of red phosphorus into polyamide-based compositions imparts a high degree of fire resistance thereto.

U.S. Pat. No. 3,883,475 describes compositions based on fire-resistant polyamide. A metal compound, advantageously cupric oxide, is incorporated in such compositions to inhibit the release of highly toxic phosphine, which is formed following a disproportionation reaction of red phosphorus under the action of the trace amounts of water which are present in the polymer and of the high temperature required for its conversion.

In French patent No. FR-A-2,367,100 an improvement is proposed, entailing the use of cadmium oxide instead of CuO; in addition to its effectiveness (at least equal to that of CuO) for inhibiting the release of phosphine, cadmium oxide also provides articles exhibiting a particularly high arc tracking resistance (within the meaning of the NF standard C 26220), which is equal to or higher than 400 volts in the case of unfilled compositions and 375 volts in the case of compositions filled with approximately 40% by weight of glass fibers relative to the weight of the polyamide of the compositions.

In French patent No. FR-A-2,553,783 a replacement is proposed for cadmium oxide (which exhibits a certain toxicity), namely, a lanthanide-based compound. With this adjuvant, the compositions based on fire-resistant polyamide which are obtained result in articles presenting a compromise of properties, in particular with regard to fire resistance, resilience and arc tracking resistance, which is better than that associated with the use of cadmium oxide.

However, serious problem remains concerning the appearance and the development, to a variable degree, of whitish stains (whitish exudations) on the surface of articles rendered fire-resistant by means of red phosphorus, when these articles are subjected to the twin effect of a high temperature and of humidity. Such a deterioration of the articles in question is encountered, for example, in hot and humid tropical countries.

It has now unexpectedly been found that the fire-resistance of the compositions described in FR-A-2,553,783 can be further enhanced and the appearance and development of stains avoided, without appreciable disadvantage to the compromise in values of the properties in respect of fire resistance, resilience and arc tracking resistance, by incorporating therein a judiciously selected hydrotalcite stabilizer.

SUMMARY OF THE INVENTION

Briefly, the present invention features novel polyamide compositions comprising a fire-resisting amount of red phosphorus, at least one lanthanide-based compound, and an effective amount of at least one hydrotalcite having the general formula:

$$Mg_{(1-a)}Al_a(OH)_2A_{a/2} \cdot pH_2O \qquad (I)$$

in which A is the anion $SO_4^{2-}$ or $CO_3^{2-}$; a is a number such that $0 < a \leq 0.5$; and p is a number representing the number of molecules of water per molecule of hydrotalcite, such that $0 < p < 1$.

DETAILED DESCRIPTION OF THE PREFERRED EMBODIMENTS OF THE INVENTION

More particularly according to the present invention, of the hydrotalcites of formula (I), preferred are those in which A is $CO_3^{2-}$. More preferred are the hydrotalcites of formula (I) in which A is $CO_3^{2-}$ and a is a number such that $0.2 \leq \leq 0.4$.

These hydrotalcites include natural hydrotalcites and hydrotalcites obtained by treatment of natural hydrotalcites. These hydrotalcites are particularly described in French patent No. FR-A-2,483,934.

The fire-resistant polyamides according to the present invention comprise the polyamides prepared by polycondensation of saturated aliphatic dicarboxylic acids containing from 6 to 12 carbon atoms with saturated aliphatic diprimary diamines containing from 6 to 12 carbon atoms, the polyaminoacids prepared either by direct homopolycondensation of ω-aminoalkanoic acids comprising a hydrocarbon chain containing from 4 to 12 carbon atoms, or by hydrolytic ring opening and polymerization of the lactams derived from such acids, and the copolyamides prepared from the starting monomers of the aforementioned polyamides, with the proviso that the acidic component of these copolyamides may partially comprise terephthalic acid and/or of isophthalic acid, and mixtures of such polyamides.

Exemplary of the polyamides prepared by polycondensation of diacids and of diamines, particularly representative are nylon 66 (polymer of hexamethylenediamine and of adipic acid), nylon 69 (polymer of hexamethylenediamine and of azelaic acid), nylon 610 (polymer of hexamethylenediamine and of sebacic acid), and nylon 612 (polymer of hexamethylenediamine and of dodecanedioic acid).

Exemplary of the polyaminoacids are nylon 4 (polymer of 4-aminobutanoic acid or of γ-butyrolactam), nylon 5 (polymer of 5-aminopentanoic acid or of δ-amylolactam), nylon 6 (polymer of ε-caprolactam), nylon 7 (polymer of 7-aminoheptanoic acid), nylon 8 (polymer of caprylolactam), nylon 9 (polymer of 9-aminononanoic acid), nylon 10 (polymer of 10-aminodecanoic acid), nylon 11 (polymer of 11-aminoundecanoic acid) and nylon 12 (polymer of 12-aminododecanoic acid or of laurolactam).

And exemplary of the copolyamides are nylon 66/610 (copolymer of hexamethylenediamine, adipic acid and sebacic acid), nylon 66/6 (copolymer of hexamethylenediamine, adipic acid and caprolactam).

The polyamides that are preferably rendered fire-resistant according to the present invention are nylon 66, nylon 610, nylon 6, nylon 66/610 and nylon 66/6.

Per the present invention, by the expression "red phosphorus" are intended the various colored allotropic varieties of phosphorus (red, violet or black phosphorus) marketed under the designation of red phosphorus.

The amount of red phosphorus generally ranges from 1% to 30% by weight relative to the weight of the polyamide to be flameproofed. This amount preferably ranges from 2% to 15% by weight. Even more preferably, this amount ranges from 6% to 12%. In general, it is desirable to incorporate the red phosphorus in a finely divided form, for example in the form of particles having a mean diameter exceeding 200 μm and preferably ranging from 1 to 100 μm.

By the term "lanthanide" are intended metals of the Periodic Table having atomic numbers ranging from 57 to 71, as well as yttrium, which has closely related properties, despite having an atomic number of 39.

By the expression "lanthanide-based compound" are intended:

(i) an organic or inorganic derivative of any one of the lanthanides: cerium, lanthanum, praseodymium, neodymium, promethium, samarium, europium, gadolinium, terbium, dysprosium, holmium, erbium, ytterbium, thulium, lutetium and yttrium; the expression "at least one lanthanide-based compound" connotes that, other than a single derivative, it is envisaged to use a mixture of organic derivatives, or a mixture of inorganic derivatives, or a mixture of organic and inorganic derivatives of any one of the aforementioned lanthanides; and (ii) a mixture of organic and/or inorganic derivatives of more than one of these lanthanides; the expression "at least one lanthanide-based compound" connotes that, other than a single mixture, it is envisaged to use a combination of several mixtures of this type.

In general, because of the relative amounts of the compounds of the various lanthanides in the most common ores, especially in monazite and bastnaesite, when a derivative of a single lanthanide is used, the latter is preferably cerium, lanthanum, praseodymium and neodymium. Cerium and lanthanum are the most abundant of these metals and are very particularly suitable.

Mixtures of derivatives of a plurality of lanthanides may also be employed. It may be advantageous, indeed, not to carry out the lengthy and costly separation of all of the lanthanides present in relatively small amounts in the ores which are generally treated. In such cases, the following mixtures are typically used:

(i) mixture of derivatives of cerium and of one or more of the other lanthanides;

(ii) mixture of derivatives of lanthanum and of one or more other lanthanides selected from among praseodymium, neodymium, promethium, samarium, europium, gadolinium, terbium, dysprosium, holmium, erbium, ytterbium, thulium, lutetium and yttrium;

(iii) mixture of derivatives of praseodymium and of one or more other lanthanides selected from among neodymium, promethium, samarium, europium, gadolinium, terbium, dysprosium, holmium, erbium, ytterbium, thulium, lutetium and yttrium; and (iv) mixture of derivatives of neodymium and of one or more other lanthanides selected from among promethium, samarium, europium, gadolinium, terbium, dysprosium, halmium, erbium, ytterbium, thulium, lutetium and yttrium.

When such mixtures of derivatives of a plurality of lanthanides are incorporated in the compositions according to the invention, cerium and/or lanthanum and/or praseodymium and/or neodymium generally constitute at least 40 mol % of the total amount of lanthanides.

By "organic lanthanide derivative" are more particularly intended the salts of various carboxylic acids, the metal derivatives of phenolic compounds, mercaptides and chelates of β-dicarbonyl compounds.

More specifically, the organic lanthanide derivatives are advantageously selected from among:

(i) the lanthanide salts of monocarboxylic aliphatic acids containing from 2 to 30 carbon atoms or dicarboxylic acids containing from 3 to 30 carbon atoms, saturated or containing one or more ethylenic double bonds, or substituted such acids bearing one or more substituents such as halogen atoms, hydroxyl groups, alkoxy radicals containing from 1 to 12 carbon atoms, mercapto groups, phenyl, phenoxy, naphthyl or cyclohexyl radicals, the ring members of which are optionally substituted by one or more halogen atoms, hydroxyl groups, alkyl radicals containing 1 to 6 carbon atoms or alkoxy radicals containing 1 to 6 carbon atoms; benzoic, 1-naphthoic, 2-naphthoic, cyclopentanecarboxylic, cyclohexanecarboxylic, cyclopentenecarboxylic or cyclohexenecarboxylic acids, with the proviso that the ring member of such acids may comprise one or more substituents such as halogen atoms, hydroxyl groups, alkyl radicals containing 1 to 12 carbon atoms, alkenyl radicals containing 2 to 12 carbon atoms, alkoxy radicals containing 1 to 12 carbon atoms, phenyl, benzyl, phenoxy or cyclohexyl radicals, alkoxycarbonyl radicals containing 2 to 24 carbon atoms or alkenoxycarbonyl radicals containing 4 to 24 carbon atoms; alkyl monoesters (the alkyl moiety containing 1 to 24 carbon atoms) or alkenyl monoesters (the alkenyl moiety containing 3 to 24 carbon atoms) of the dicarboxylic aliphatic acids indicated above; heterocyclic carboxylic acids, especially those derived from pyridine, furan, thiophene, pyrrole and pyran, or substituted such heterocycles bearing one or more substituents such as halogen atoms, hydroxyl groups, alkyl radicals containing 1 to 12 carbon atoms, alkoxy radicals containing 1 to 12 carbon atoms, alkenyl radicals containing 2 to 12 carbon atoms, alkoxycarbonyl radicals containing 2 to 24 carbon atoms or alkenoxycarbonyl radicals containing 4 to 24 carbon atoms;

(ii) lanthanide phenolates derived from phenol, 1-naphthol or 2-naphthol, the ring members of which may contain one or more substituents such as halogen atoms, alkyl or alkoxy radicals containing 1 to 24 carbon atoms, alkenyl radicals containing 2 to 24 carbon atoms, phenyl, benzyl, phenoxy or cyclohexyl radicals;

(iii) lanthanide mercaptides, especially those derived from thioglycolic or thiomalic acids and their alkyl esters (the alkyl radical containing 1 to 12 carbon atoms), alkenyl esters (the alkenyl radical containing 2 to 12 carbon atoms), phenyl, benzyl, cyclohexyl, alkanediol (containing 2 to 12 carbon atoms), dihydroxybenzene, or dihydroxycyclohexane esters, with the proviso that the ring members of such esters may be substituted by one or more alkyl or alkoxy radicals containing from 1 to 6 carbon atoms; and (iv) the lanthanide chelates of β-dicarbonyl compounds, especially those derived from the compounds of general formula (II):

$$R_1-CO-CHR_2-CO-R_3 \qquad (II)$$

in which $R_1$ and $R_3$, which may be identical or different, are each a linear or branched chain alkyl radical containing 1 to 36 carbon atoms, optionally substituted by one or more halogen atoms, a linear or branched chain alkenyl radical containing 3 to 36 carbon atoms, optionally substituted by one or more halogen atoms, an aryl radical or a substituted aryl radical bearing one or more substituents on the aromatic ring, such as alkyl radicals containing 1 to 6 carbon atoms, optionally substituted by one or more halogen atoms, alkenyl radicals containing 2 to 6 carbon atoms, optionally substituted by one or more halogen atoms, the nitro group, the —CHO group, the —COOH group, alkoxy groups containing 1 to 6 carbon atoms, —COOR$_4$ radicals, R$_4$ being an alkyl radical containing 1 to 12 carbon atoms or an alkenyl radical containing 2 to 12 carbon atoms, the OH group, halogen atoms, an aralkyl radical in which the aliphatic moiety contains from 1 to 12 carbon atoms and the cyclic moiety may contain one or more of the substituents indicated above, a cycloaliphatic radical containing from 5 to 12 carbon atoms and the cyclic moiety of which may contain one or more carbon-carbon double bonds and bear one or more of the substituents indicated above, a chain sequence of a plurality of the radicals indicated above, with the proviso that the various aliphatic radicals defined above may contain one or more bridging oxygen —O— or sulfur —S— atoms or —CO— or carboxylate —COO— groups; and R$_2$ is a halogen atom.

Among the organic lanthanide derivatives which can be incorporated into the compositions according to the invention, those preferred, in particular for practical reasons or for economic reasons of availability or of price are:

(i) the lanthanide salts of monocarboxylic aliphatic acids containing from 6 to 24 carbon atoms, saturated or containing an ethylenic double bond, or substituted such acids bearing one or more substituents such as chlorine atoms, hydroxyl groups, alkoxy radicals containing from 1 to 6 carbon atoms, phenyl, phenoxy or cyclohexyl radicals, the ring members of which optionally being substituted by one or more chlorine atoms, hydroxyl groups, alkyl or alkoxy radicals containing 1 to 6 carbon atoms; mercaptomonocarboxylic acids containing from 2 to 6 carbon atoms or mercaptodicarboxylic acids containing from 3 to 6 carbon atoms; benzoic or cyclohexanecarboxylic acids, the cyclic moiety of which may contain one or more substituents such as chlorine atoms, hydroxyl groups, alkyl or alkoxy radicals containing 1 to 6 carbon atoms or alkoxycarbonyl radicals containing 2 to 12 carbon atoms; alkyl monoesters (the alkyl moiety containing 1 to 12 carbon atoms) of dicarboxylic aliphatic acids containing 4 to 24 carbon atoms, saturated or containing an ethylenic double bond or substituted such monoesters containing one or more substituents such as chlorine atoms, hydroxyl groups, mercapto groups or alkoxy radicals containing 1 to 6 carbon atoms; and (ii) lanthanide phenolates derived from phenol, the ring moiety of which may contain one or more substituents such as chlorine atoms, alkyl or alkoxy radicals containing 1 to 12 carbon atoms, or phenyl, benzyl, phenoxy or cyclohexyl radicals.

Exemplary of the organic lanthanide derivatives are:

(a) lanthanide, especially cerium, lanthanum, praseodymium and neodymium salts of propionic, hexanoic, n-octanoic, 2-ethylhexanoic, isooctanoic, nonanoic, decanoic, lauric, stearic, oleic, ricinoleic, margaric, tetradecanoic, 12-hydroxystearic, docosanoic, 13-docosenoic (erucic acid), 2-chlorodecanoic, 2-octyldecanoic, 2-hydroxyhexanoic, thioglycolic, mercaptopropionic, thiomalic, 6-cyclohexylhexanoic, benzoic, phenylacetic, 2-phenylpropanoic, 2-methylbenzoic, 4-methylbenzoic, 2-phenoxybenzoic, 4-propylbenzoic, 4-methoxybenzoic, 4-tert-butylbenzoic, salicylic, 5-tert-butylsalicylic, 4-hydroxy-3-methoxybenzoic, 3,4-dimethoxybenzoic, 1-naphthoic, 2-naphthoic, cyclohexanecarboxylic, nicotinic, isonicotinic and 4-methyl-3-furancarboxylic acids, of monoisooctyl maleate, of mono(2-ethoxyethyl) maleate, of monobutyl phthalate, of monobutyl thiomalate and of monohexyl thiomalate;

(b) lanthanide, especially cerium, lanthanum, praseodymium and neodymium phenolates of the following phenolic compounds: phenol, cresols, ethylphenols, xylenols, butylphenols, isopentylphenols, isooctylphenols, tert-nonylphenols, decylphenols, dodecylphenols, tertoctylphenols, 4-cyclohexylphenol, 4-phenylphenol, di-tert-nonylphenols and methylisohexylphenols;

(c) lanthanide, especially cerium, lanthanum, praseodymium and neodymium chelates of the following β-diketones: 2,4-heptanedione, 2,4-decanedione, 2-ethyl-2-decene-6,8-dione, 2-methyl-2-nonene-6,8-dione, stearoylacetone, 1-stearoyl-2-octanone, ethyl 7,9-dioxodecanoate, benzoylacetone, acetylacetone, 1-benzoyl-2-octanone, 1,4-diphenyl-1,3-butanedione, stearoylacetophenone, palmitoylacetophenone, 1-benzoyl-4-methylpentanone, benzoyloctacosanoylmethane, para-methoxybenzoylstearoylmethane and dibenzoylmethane;

(d) lanthanide, especially cerium, lanthanum, praseodymium and neodymium mercaptides of thioglycolic acid, or isooctyl thioglycolate, of octadecyl thioglycolate, of benzyl thioglycolate, of lauryl thioglycolate, of 1,4-cyclohexanediol dithioglycolate, of 4-tert-butylcyclohexyl thioglycolate, of thiomalic acid, of hexyl thiomalate, of 2-ethylhexyl thiomalate, of dodecyl thiomalate, of benzyl thiomalate, of cyclohexyl thiomalate, of 1,3-propanediol thiomalate, of 1,4-butanediol thiomalate and of 1,6-hexanediol thiomalate.

Organic lanthanide derivatives which are not available directly are prepared by classical methods such as the reaction of a carboxylic acid or of its anhydride, of a phenolic compound, of a mercaptocarboxylic acid (or of one of its esters) or of a β-diketone with a lanthanide oxide or hydroxide or, as the case may be, with a mixture of such oxides or hydroxides, in a suitable solvent medium and with heating if necessary.

By "inorganic lanthanide derivative" are particularly intended the oxides, the hydroxides, the salts of inorganic hydracids and the salts of inorganic oxyacids.

Specifically exemplary of the lanthanide salts of inorganic hydracids are the chloride, bromide, iodide, sulfide, selenide and telluride. Exemplary lanthanide salts of inorganic oxyacids are the sulfite, sulfate, sulfonate, nitrite, nitrate, phosphite, phosphate, pyrophosphate, carbonate, perchlorate, antimonate, arsenate, selenite, selenate, vanadate and tungstate.

Among the inorganic lanthanide derivatives which can be incorporated into the compositions according to the invention, those advantageously selected, in particular for practical reasons or for economic reasons of availability or price, are lanthanide oxides, chlorides, sulfates or nitrates.

In the lanthanide derivatives incorporated into the compositions of the invention, the lanthanide may be present in its various oxidation states; in most cases it is in the oxidation states of III or IV.

In a highly preferred embodiment of the present invention, incorporated is an effective amount of at least one lanthanum-based compound selected from among lanthanum(III) stearate, lanthanum(III) oxide, lanthanum(III) chloride, cerium(III) stearate, cerium(IV) oxide and cerium(III) chloride.

The amount of lanthanide-based compound(s) which is incorporated can vary over very wide limits. Advantageously, this amount is determined such as to contribute from $0.1 \times 10^{-3}$ to $100 \times 10^{-3}$ gram-atoms of metal belonging to the lanthanide group per 100 g of polyamide. This amount is preferably determined such as to contribute from $0.2 \times 10^{-3}$ to $30 \times 10^{-3}$ gram-atoms of metal of the lanthanide group per 100 g of polyamide. Even more preferably, this amount is determined such as to contribute from $0.3 \times 10^{-3}$ to $10 \times 10^{-3}$ gram-atoms of metal of the lanthanide group per 100 g of polyamide.

The lanthanide-based compound can be in a solid or pasty form. In the case of a solid compound, the latter is generally employed in the form of particles having a mean diameter not exceeding 200 μm and, preferably, ranging from 0.5 to 100 μm.

As indicated above, the compositions of the present invention must additionally contain an effective amount of at least one hydrotalcite of formula (I). These inorganic compounds are typically incorporated in the form of particles having a mean diameter not exceeding 200 μm, preferably ranging from 0.1 to 100 μm.

When the compound employed (lanthanum-based compound, hydrotalcite) is available in anhydrous form or in a crystallized form with molecules of water, it is preferred to use the anhydrous compound or one containing the least possible water of crystallization, to avoid or to limit a release of water during the conversion.

The amount of hydrotalcite(s) which is used may vary over wide limits as a function of the desired degree of stabilization; advantageously, this amount ranges from 0.1% to 5% by weight relative to the weight of the polyamide present in the composition, and preferably ranges from 0.4% to 2% by weight.

The compositions according to the present invention can be formulated simply by mixing the various constituents in any suitable fashion permitting a homogeneous composition to be produced. The mixing of the various constituents in powder or granular form is preferably carried out by first formulating a cold premix in a conventional mixer, followed by homogenizing the premix by blending with heating to a temperature which is generally higher than 200° C. in a single-or multi-screw extruder. The extrusion operation is preferably carried out under an inert atmosphere, such as that of nitrogen or argon, for example. Upon completion of this treatment, rods are obtained which are cooled in water and are then chopped into granules, it being possible for the latter to be optionally subjected to a drying operation. The compositions according to the invention can, furthermore, be prepared by formulating a masterbatch, present in a granular form based on a part of the polyamide to be rendered fire-resistant, of red phosphorus, of the lanthanide-based compound and of hydrotalcite(s), which will then be mixed, before use, with the granules of the remainder of the polyamide to be flameproofed.

These compositions have been defined above by their essential constituents. It will of course be appreciated that it is envisaged to modify these compositions in the manner indicated below. Thus, where red phosphorus, for example, is concerned, it is possible to use either red phosphorus as such, or to use, and this is a preferred embodiment, red phosphorus particles coated with a film of polymer. Exemplary of such polymers, particularly representative are epoxy resins (cf. French patent No. FR-A-2,314,221), polymers containing maleic, fumaric or allyl unsaturated bonds (cf. French patent No. FR-A-2,314,219), saturated polyesters having a melting point of from 50° to 90° C. and having a molecular weight below 10,000 (cf. French patent No. FR-A-2,373,575), thermoplastic phenol/formaldehyde polycondensates of the novolak type (cf. French patent No. FR-A-2,344,615), thermoplastic phenol/isobutyraldehyde polycondensates (cf. European patent application No. EP-A-0,071,788); the thermoplastic phenol/formaldehyde polycondensates circumscribe a particularly preferred embodiment of the present invention. The amount of polymer used to coat the phosphorus particles, where appropriate, may vary over wide limits. This amount generally constitutes 5% to 50% of the total weight of the red phosphorus/coating polymer mixture. It should be noted that it is possible to use, without any difficulty, amounts of coating polymer which are greater, ranging up to 90% of the total weight of the red phosphorus/coating polymer mixture.

Furthermore, when they are intended, for example, for producing shaped articles, the compositions according to the invention may include various additives. Thus, they may contain reinforcing or gelling fillers such as glass or asbestos fibers, ballotini, kaolin, silica, micas, bentonites, bentones or mixtures of these species. Among the above-mentioned fillers, those most commonly employed are glass fibers; these fibers generally have a mean diameter of from 1 to 15 μm and a length of from 2 to 8 mm. To produce particles having optimum mechanical properties, it is advantageous to employ fibers which are sized, for example with epoxy resins, polyester resins, polyurethane resins or vinyl resins, these resins generally being used in combination with bridging agents of the aminosilane type. The proportions of fillers may vary from, for example, 10% to 60% by weight relative to the weight of the polyamide of the composition.

It is also possible to incorporate other additives, such as lubricants, impact improvers, pigments or colorants, antistatic agents or nucleating agents; these latter additives and their use are widely described in the literature.

The compositions in accordance with the invention can be converted into finished or semifinished shaped articles by application of the usual injection molding or extrusion techniques. One of the advantages of these compositions is that such conversion, which is generally carried out at a temperature on the order of 200° to 320° C. is accompanied by only a very low emission of phosphine into the atmosphere; the latter is generally below 0.3 ppm and even below 0.1 ppm. The limit of 0.3 ppm represents the maximum permissible concentration (cf. the work by Sax, "Dangerous Properties of Industrial Materials", 3rd edition, pages 1019 and 1020). With suitable phosphorus concentrations, the shaped articles produced are fire-resistant and do not give rise to the formation of droplets of molten, possibly flaming, material when exposed to a flame. The flammability according to the Underwriters Laboratories UL 94 vertical test (for test specimens with a thickness of 1.6 mm) falls in the classification range from V0 to V1. The particles obtained exhibit an excellent arc tracking resistance, which may be well above 400 volts in the case of compositions filled with, for example, approximately 40% by weight of glass fibers relative to the weight of the polyamide of the compositions. It is found, furthermore, that the fire-resistant shaped articles produced also have an excellent resilience which, when starting with compositions filled with, for example, approximately 40% by weight of glass fibers relative to the weight of the polyamide of the compositions, can attain and exceed an unnotched Charpy impact strength of 24 kJ/m$^2$. The performance recorded in respect of fire-resistance and resilience is substantially on the same order as that attained in the absence of hydrotalcite. On the other hand, where arc tracking resistance and aging behavior in a hot and humid atmosphere are concerned, it is found that the performance recorded is superior. In particular, with regard to the whitish exudations which appear when fire-resistant articles are aged in a hot and humid atmosphere, it is observed that, with the compositions according to the present invention, this phenomenon is very markedly diminished, compared with the case in the absence of hydrotalcite or with other stabilizing systems of a different type.

The fire-resistant compositions according to the present invention are particularly suitable for the manufacture of shaped articles which can be employed in the electricity industries (for example electrical and electronics industries, household appliances, radio and automotive industries). The characteristics of these compositions also make it possible to manufacture articles by spinning and film extrusion.

In order to further illustrate the present invention and the advantages thereof, the following specific examples are given, it being understood that same are intended only as illustrative and in nowise limitative.

The Test A, described below, will be used to show the behavior of a control composition comprising:
(i) nylon 66;
(ii) red phosphorus coated with a phenol/formaldehyde polycondensate;
(iii) glass fibers;
(iv) cerium(III) stearate; and
(v) a lubricant,
in respect of fire-resistance, resilience, arc tracking resistance and aging behavior in a hot and humid atmosphere.

TEST A

1. Description of the Raw Materials (i) nylon 66 (polymer of hexamethylenediamine and of adipic acid): this was a polymer having a viscosity index of 133 ml/g (determined according to ISO standard R 307, 1977 edition, on the fraction soluble in 90% formic acid);

(ii) coated red phosphorus: this was a composition which will be referred to hereinafter by the expression "phosphorus masterbatch", containing 60% by weight of red phosphorus having a mean particle size of 20 to 30 μm, coated with 40% by weight of a phenol/formaldehyde polycondensate having a melting point of 80° C. and a molecular weight of 800 (resin marketed by Bakelite under reference 85 36 29). This coating was carried out as follows: the resin was melted in a reactor heated by steam to 120° C. and the red phosphorus was added slowly under an inert atmosphere, the temperature of the mixture being increased to 148° C. The mixture was then cast in the form of slabs, which were broken up under an inert atmosphere;

(iii) glass fibers: these were staple fibers having a mean diameter of 10 μm and a length ranging from 3 to 6 mm, coated with a size for polyamide and marketed by Owens Corning Fiberlgas under reference R 17 BX 1;

(iv) cerium(III) stearate $[Ce(C_{17}H_{35}COO)_3]$: this was employed mixed with polyethylene sebacate and a binder based on the nylon 66 referred to above; this mixture, referred to hereinafter by the expression "lanthanide masterbatch", contained: 38.06% by weight of cerium(III) stearate, 13.27% by weight of polyethylene sebacate and 48.67% by weight of nylon 66.

2. Composition of the Test

A composition was prepared from:
(i) 100 parts by weight of nylon 66;
(ii) 39.75 parts by weight of glass fibers;
(iii) 17.49 parts by weight of phosphorus masterbatch (red phosphorus: 10.49 parts by weight); and
(iv) 1.79 parts by weight of lanthanide masterbatch (cerium(III) stearate: 0.681 part by weight and $0.683 \times 10^{-3}$ gram-atoms of cerium/100 g of nylon).

3. General Operating Procedure and Controls

The composition was formulated in the following manner:

A dry premix of the various constituents was first produced at 25° C. by charging same through a Moritz trademark mixer.

This premix was then blended in the molten state in a Prodex trademark vented extruder that comprised a screw of diameter D equal to 63 mm and 26 D in length; the screw employed was a frustoconical screw which had a suitable profile for processing polyamides. Argon was introduced continuously into the feed hopper of the vented extruder. The extruder was also fitted with a die having two 5-mm diameter holes. The extrusion conditions were as follows:

| | |
|---|---|
| Temperature: | 320° C. |
| Vacuum: | $93.1 \times 10^2$ Pa |
| Screw speed: | 50 revolutions/min. |

The material pressure at the end of the screw and the material throughput were noted. The product collected in rod form was cooled by passing it through a cold water bath and it was then granulated and dried.

The water content and the viscosity index of the nylon 66 were determined on the molding powder thus obtained.

To determine the viscosity index, the time for dissolving in formic acid, to obtain a complete dissolution, was usually 2 hours at 25° C.

The viscosity index of the nylon 66 was determined again, but this time on a molded test specimen. These test specimens were prepared with the aid of a DK trademark type 60 screw press. In this press, the granules of the molding powder were melted at a temperature of 280° C. to 300° C. (depending on the type of test specimen) while the mold was maintained at a temperature of 80° C. The injection pressure ranged from 80 MPa to 100 MPa (depending on the type of test specimen). The injection cycle time ranged from 17 s to 25 s (depending on the type of test specimen).

The following other characteristics were determined on test specimens molded under the conditions indicated above:

(1) the resilience, consisting of the Charpy impact strength: this was measured at 23° C. on unnotched and notched 60×10×4 mm bar type test specimens aged in a manner known per se at RH O (=0% relative humidity) or RH 50, according to NF standard T 51 035; the results are expressed in kJ/m$^2$;

(2) the flammability according to the Underwriters Laboratories UL 94 vertical test, as described in document 9750-1 of the Bureau for the Standardization of Plastics, to measure the degree of fire resistance; test specimen dimensions: 127×12.7×1.6 mm;

(3) the arc tracking resistance index (abbreviated to TRI) according to NF standard C 26 220; the measurements were performed on test specimens 50×50×3 mm in size; and (4) the aging behavior in a hot and humid atmosphere, designated a tropicalization test hereinafter.

The tropicalization test was carried out by following the concept of the conditions of NF standard T 51181 (test cycle C 3 A). Test specimen dimensions: 100×100×3 mm. Operating procedure: the test specimens were arranged vertically in a 20-liter desiccator containing 1,500 cm$^3$ of an aqueous solution of sulfuric acid containing 15% by weight of pure acid, such as to provide a relative humidity of 93%. Two test specimens, used as a guard, were placed on the periphery of the desiccator. Between the test specimens used as a guard were arranged, on the one hand, two test specimens molded from a composition to be tested (in this case, that in accordance with the example given below) and, on the other hand, two test specimens molded from a reference composition (in this case, that in accordance with the present Test A). The desiccator was then placed in an oven heated to 70° C. for 8 hours; the oven heating was then switched off, the oven door was opened and the desiccator and its contents were permitted to cool under these conditions for 16 hours. The combination: heating 8 hours at 70° C. + cooling 16 hours to ambient temperature, constitutes one aging cycle. The results of the surface appearance of the test specimens were noted after 17 cycles. Scoring of the results: the scoring ranged from 0 to 10: the number 0 indicates that there was no exudation; the number 10 indicates that the test specimen was completely covered with whitish stains; the scoring takes into account the extent and the intensity of the whitish exudations.

In addition, during the extrusion, air samples were taken at the outlet of the vacuum pump by means of a CH 31 101 Draeger tube to monitor for the possible presence of phosphine.

4. Results of Test A

The results obtained are reported in the Table, given below.

EXAMPLE

1. Scope of the Example

This experiment permitted assessing the behavior of a composition based on polyamide and on glass fibers, flame-proofed by means of coated red phosphorus and containing cerium(III) stearate and a lubricant, into which there was additionally incorporated a hydrotalcite of the formula:

$$Mg_{0.7}Al_{0.3}(OH)_2(CO_3)_{0.15}.0.5\ H_2O$$

marketed by Mitsui under the trademark Alcamizer.

More precisely, an amount of hydrotalcite representing 0.79% by weight relative to the nylon 66 present in the composition (considering the polyamide present in the lanthanide masterbatch) was introduced into the composition in accordance with that of Test A.

The composition obtained from the following constituents was therefore prepared:

(i) 100 parts by weight of nylon 66;
(ii) 40.06 parts by weight of glass fibers;
(iii) 17.63 parts by weight of phosphorus masterbatch (red phosphorus: 10.58 parts by weight);
(iv) 1.81 parts by weight of lanthanide masterbatch (cerium(III) stearate: 0.688 part by weight and 0.689×10$^{-3}$ gram-atoms of cerium/100 g of nylon);
(v) 80 part by weight of hydrotalcite.

In this example, the nylon 66, the glass fibers, the phosphorus masterbatch and the lanthanide masterbatch were identical with the constituents used in Test A. With regard to the hydrotalcite now introduced, its particle size distribution was the following: 100% of particles of less than 5 μm.

2. General operating procedure and controls

The formulation of the composition was carried out in the manner indicated above in Section 3 of the description of Test A. It should be noted that the extrusion running conditions were as follows:

| | |
|---|---|
| Temperature: | 320° C. |
| Vacuum: | 93.1 × 10$^2$ Pa |
| Screw speed: | 50 revolutions/min. |

With regard to the controls exercised, the various physicomechanical characteristics referred to above in Section 3 of the description of Test A were determined. It should be noted that the conditions shown in Section 3 of the description of Test A were reproduced to manufacture the molded test specimens.

3. Results of the Example

The results obtained are reported in the Table, given below.

TABLE

| | EXTRUSION | | | MOLDING POWDER | | | CHARPY IMPACT | |
|---|---|---|---|---|---|---|---|---|
| | Material | | | Calculated | | | | |
| TEST EXAMPLE | pressure at screw end, MPa | Material throughput kg/h | PH$_3$ release ppm | phosphorus content % | Water content % | Viscosity index ml/g | UNNOTCHED 0 RH kJ/m$^2$ | NOTCHED 0 RH kJ/m$^2$ |
| A | −20 | 35 | <0.2 | 10.39 | 0.15 | 142 | 26 | 8 |
| Example | −20 | 35 | <0.1 | 10.48 | 0.19 | 136 | 24 | 7.6 |

| | UL 94 classification thickness 1.6 mm | TRI | | Viscosity index on molded test specimens ml/g | Tropicalization |
|---|---|---|---|---|---|
| TEST EXAMPLE | | Voltage V | Erosion mm | | 17 cycles |

| | | | | | |
|---|---|---|---|---|---|
| A | V-0 | 375 | 0.1 | 130 | 7 |
| Example | V-1 | 450 | 0.1 | 120 | 2 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

We claim:

1. A composition of matter comprising a major amount of a polyamide, a fire-resisting amount of red phosphorus therefor, at least one lanthanide-based compound, and an effective amount of at least one hydrotalcite having the general formula:

$$Mg_{(1-a)}Al_a(OH)_2A_{a/2} \cdot pH_2O \qquad (I)$$

in which A is the anion $SO_4^{2-}$ or $CO_3^{2-}$; a is a number such that $0 < a \leq 0.5$; and p is a number representing the number of molecules of water per molecule of hydrotalcite, such that $0 < p < 1$, wherein the amount of hydrotalcite ranges from 0.1% to 5% by weight relative to the weight of said polyamide.

2. The polyamide composition as defined in claim 1, said polyamide comprising a polycondensate of saturated aliphatic dicarboxylic acids containing from 6 to 12 carbon atoms with saturated aliphatic diprimary diamines containing from 6 to 12 carbon atoms, a polyaminoacid which comprises a direct homopolycondensate of an ω-aminoalkanoic acid having from 4 to 12 carbon atoms, or produced by hydrolytic opening and polymerization of a lactum thereof, a copolyamide of the above monomers of the above-mentioned polyamides, with the proviso that the acidic component of such copolyamides may at least in part comprise terephthalic acid and/or of isophthalic acid, and mixtures of such polyamides.

3. The polyamide composition as defined by claim 1, said lanthanide-based compound comprising an organic or inorganic compound of cerium, lanthanum, praseodymium, neodymium, promethium, samarium, europium, gadolinium, terbium, dysprosium, holmium, erbium, ytterbium, thulium, lutetium or yttrium; or a mixture of organic and/or inorganic compounds of such lanthanides.

4. The polyamide composition as defined by claim 3, wherein the amount of lanthanide-based compound comprises from $0.1 \times 10^{-3}$ to $100 \times 10^{-3}$ gram-atoms of lanthanide group metal per 100 g of polyamide.

5. The polyamide composition as defined by claim 1, comprising from 1% to 30% by weight of red phosphorus relative to the weight of the polyamide.

6. The polyamide composition as defined by claim 1, said red phosphorus comprising particles coated with a film of polymer.

7. The polyamide composition defined by claim 6, said coating polymer comprising an epoxy resin, a polymer which comprises maleic, fumaric or allylic unsaturation, a saturated polyester, a thermoplastic phenol/formaldehyde polycondensate or a phenol/isobutyraldehyde polycondensate.

8. The polyamide composition as defined by claim 1, further comprising glass fibers, in an amount ranging from 10 to 60% relative to the weight of the polyamide.

9. A shaped article comprising the polyamide composition as defined by claim 1.

* * * * *